United States Patent
Lee et al.

(10) Patent No.: US 10,191,554 B2
(45) Date of Patent: Jan. 29, 2019

(54) DISPLAY APPARATUS AND CONTROLLING METHOD THEREOF

(71) Applicant: SAMSUNG ELECTRONICS CO., LTD., Suwon-si (KR)

(72) Inventors: Bong-seok Lee, Suwon-si (KR); Dong-Hun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 14/657,462

(22) Filed: Mar. 13, 2015

(65) Prior Publication Data

US 2015/0261305 A1    Sep. 17, 2015

(30) Foreign Application Priority Data

Mar. 14, 2014    (KR) .................. 10-2014-0030414

(51) Int. Cl.
  *G06F 3/01*    (2006.01)
  *G06K 9/00*    (2006.01)
  *G06F 3/03*    (2006.01)
  *G06F 3/0484*  (2013.01)

(52) U.S. Cl.
  CPC .............. *G06F 3/017* (2013.01); *G06F 3/011* (2013.01); *G06F 3/0304* (2013.01); *G06F 3/04842* (2013.01); *G06K 9/00362* (2013.01); *G06K 9/00302* (2013.01); *G06K 9/00355* (2013.01)

(58) Field of Classification Search
  CPC .. G06F 3/04842; G06F 3/04883; G06F 3/167; G06F 3/017; G06F 3/00362; G06F 3/011; G06F 3/0304; G06F 3/0425; G06K 9/2081; G06K 9/00355; H04N 21/4223
  See application file for complete search history.

(56) References Cited

U.S. PATENT DOCUMENTS

| | | | |
|---|---|---|---|
| 2010/0117959 A1 | 5/2010 | Hong et al. | |
| 2012/0131520 A1* | 5/2012 | Tang .................. | G06F 3/04842 715/863 |

(Continued)

FOREIGN PATENT DOCUMENTS

| | | |
|---|---|---|
| CN | 102681659 A | 9/2012 |
| EP | 2474883 A1 | 7/2012 |

(Continued)

OTHER PUBLICATIONS

Communication dated May 27, 2015, issued by the International Search Authority in counterpart International Application No. PCT/KR2015/002385 (PCT/ISA/210 & PCT/ISA/237).

(Continued)

*Primary Examiner* — Robert Michaud
(74) *Attorney, Agent, or Firm* — Sughrue Mion, PLLC

(57) ABSTRACT

A display apparatus and a controlling method thereof are provided. The controlling method of a display apparatus includes displaying a mode conversion user interface (UI) that provides a guideline to enter a motion task mode; recognizing a first motion that corresponds to the guideline; entering the motion task mode that enables a second motion to control a function of the display apparatus in response to the first motion being recognized while the guideline is displayed on the display apparatus; and displaying a motion task UI to perform the motion task mode.

26 Claims, 15 Drawing Sheets

(56) References Cited

U.S. PATENT DOCUMENTS

| | | | |
|---|---|---|---|
| 2012/0176305 A1* | 7/2012 | Ryu | G06F 3/017 345/156 |
| 2012/0176552 A1 | 7/2012 | Ryu et al. | |
| 2013/0033422 A1 | 2/2013 | Choi et al. | |
| 2013/0033649 A1* | 2/2013 | Kim | G06F 3/017 348/734 |
| 2013/0035942 A1* | 2/2013 | Kim | G06F 3/167 704/275 |
| 2013/0050458 A1 | 2/2013 | Kim et al. | |
| 2013/0076990 A1 | 3/2013 | Kim et al. | |
| 2013/0107026 A1 | 5/2013 | Kim | |
| 2013/0208135 A1 | 8/2013 | Han et al. | |
| 2013/0328769 A1 | 12/2013 | Jung | |
| 2014/0152545 A1* | 6/2014 | Nagata | G06F 3/017 345/156 |

FOREIGN PATENT DOCUMENTS

| | | |
|---|---|---|
| EP | 2 626 929 A1 | 8/2013 |
| JP | 2012-194915 A | 10/2012 |
| KR | 10-2011-0051677 A | 5/2011 |
| KR | 10-2011-0105671 A | 9/2011 |
| KR | 10-2012-0096849 A | 8/2012 |
| KR | 1020130092360 A | 8/2013 |
| WO | 2012/093822 A2 | 7/2012 |

OTHER PUBLICATIONS

Communication dated Oct. 13, 2017, issued by the European Patent Office in counterpart European Application No. 15760639.3.
Communication dated Jul. 4, 2018, issued by The State Intellectual Property Office of People's Republic of China in counterpart Chinese Application No. 201580013392.8.

* cited by examiner

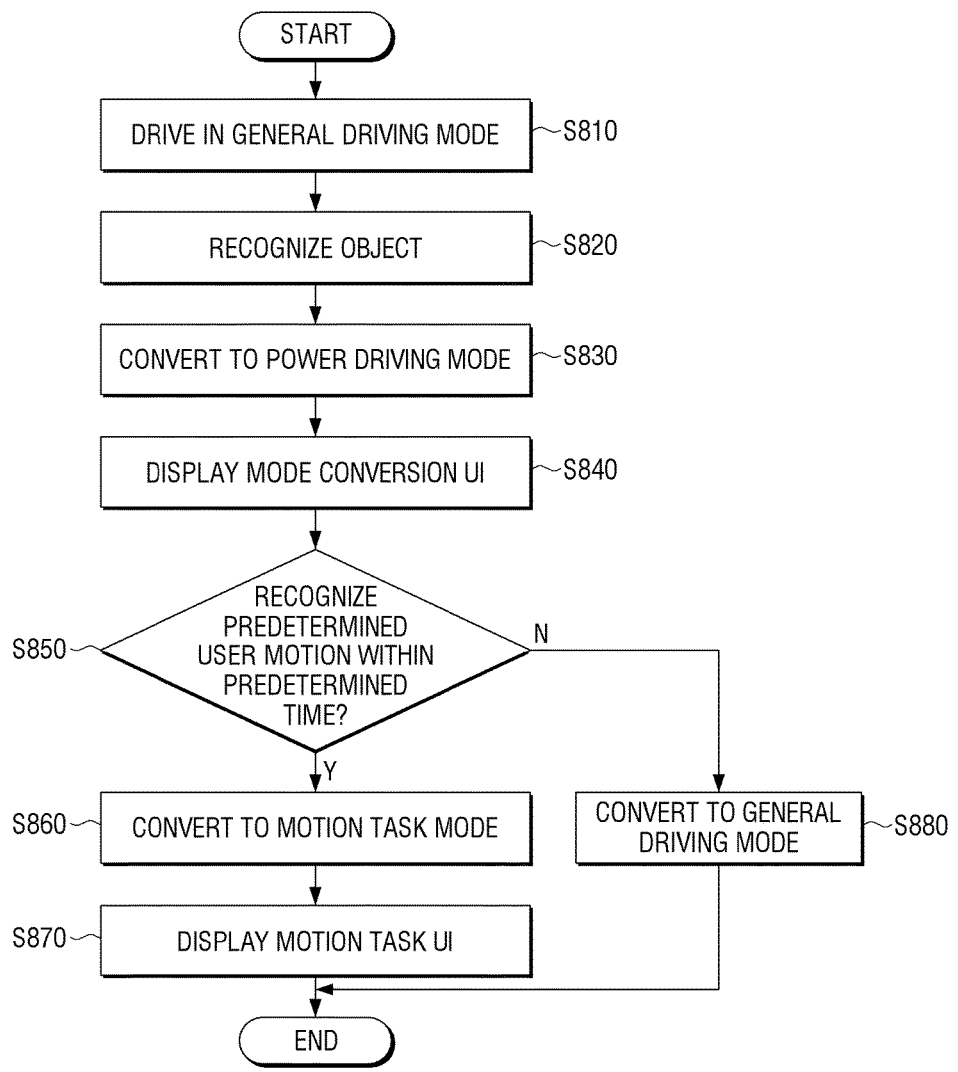

DISPLAY APPARATUS AND CONTROLLING METHOD THEREOF

CROSS-REFERENCE TO RELATED APPLICATION

This application claims priority from Korean Patent Application No. 10-2014-0030414, filed in the Korean Intellectual Property Office on Mar. 14, 2014, the disclosure of which is incorporated herein in its entirety by reference.

BACKGROUND

1. Field

Apparatuses and methods consistent with exemplary embodiments relate to a display apparatus which is controlled by a user motion input through a motion recognition unit, and a controlling method thereof.

2. Description of the Related Art

With the development of electronic technology, various types of electronic devices have been developed and distributed. In particular, various display apparatuses such as TV, mobile phone, PC, notebook PC, PDA, and tablet PC have been widely used in general households.

There are growing demands for efficient and interactive input methods to use various functions of display apparatuses. For example, remote, mouse, touch pad, keyboard control is provided as an input method of display apparatus.

However, it is difficult to use the various functions of display apparatuses efficiently using such simple input methods. For instance, if all functions of display apparatuses are controlled by a remote controller, the number of buttons on the remote controller should increase, which makes it difficult for a user to learn how to use the remote controller.

In order to resolve the above issue, motion recognition technology has been drawing attention and developed to allow a user to control display apparatus more conveniently and intuitively.

However, existing motion recognition technology immediately displays a graphical user interface (GUI) for controlling a display apparatus when a user motion is recognized. Thus, the GUI may interfere with a user viewing contents because the GUI can pop up while the user is enjoying the contents.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a display apparatus which is capable of performing a motion task through two steps of motion recognition and a controlling method thereof.

According to an aspect of an exemplary embodiment, there is provided a controlling method of a display apparatus including: displaying a mode conversion user interface (UI) that provides a guideline to enter a motion task mode; recognizing a first motion that corresponds to the guideline; entering the motion task mode that enables a second motion to control a function of the display apparatus in response to the first motion being recognized while the guideline is displayed on the display apparatus; and displaying a motion task UI to perform the motion task mode. The displaying the mode conversion UI may be operated in an intermediate mode, and the method further comprising recognizing, in an initial mode, a triggering input that activates the intermediate mode.

The triggering input may be at least one of an appearance of an object, a motion of the object, and a voice command which activates the intermediate mode.

The motion conversion UI may include a mode conversion icon configured to activate the motion task mode and a pointer configured to move towards the mode conversion icon according to the first motion.

The entering the motion task mode may include entering the motion task mode in response to the pointer moving to and being placed on the mode conversion icon according to the first motion.

The guideline may indicate a predetermined motion pattern set to activate the motion task mode.

The entering the motion task mode may include entering the motion task mode in response to the first motion corresponding to the predetermined motion pattern.

The method may further include operating in a general driving mode before the mode conversion UI is displayed, and converting the general driving mode to a power driving mode in response to the mode conversion UI being displayed.

The method may further include converting the power driving mode into the general power in response to the second motion not being recognized with a predetermined time after the mode conversion UI is displayed.

The method may further include recognizing an object, wherein the displaying the mode conversion UI comprises displaying the mode conversion UI in response to the object being recognized and wherein the motion task mode is controlled by tracking a motion of the recognized object.

The object may be one of a hand, a finger, an arm, and a face of a user, or an inanimate object.

According to another aspect of an exemplary embodiment, there is provided a display apparatus including a motion recognition unit configured to recognize a first motion and a second motion of a user; a display configured to display a guideline of a predetermined motion that activates a motion task mode; and a controller configured to control the display to display a mode conversion user interface (UI) that provides the guideline, enter the motion task mode that enables the second motion to control a function of the display in response to the first motion corresponding to the predetermined motion and the first motion being recognized while the guideline is displayed, and control the display to display a motion task UI to perform the motion task mode.

The controller may be further configured to control the display to display a mode conversion icon configured to activate the motion task mode and a pointer configured to move toward the mode conversion icon according to the first motion.

The controller may be further configured to enter the motion task mode in response to the pointer moving to and being placed on the mode conversion icon according to the first motion.

The controller may be further configured to control the display to display the guideline through a motion pattern guide UI which guides the user to take a predetermined motion to enter the motion task mode.

The controller may be further configured to enter the motion task mode in response to a pattern of the first motion that corresponds to the motion pattern guide UI being recognized.

The controller may be further configured to drive the display in a general driving mode before the motion conversion UI being displayed, and convert the general driving mode to a power driving mode in response to the motion conversion UI being displayed.

The controller may be further configured to convert the power driving mode to the general driving mode in response to the predetermined motion not being recognized within a predetermined time after the mode conversion UI is displayed.

The controller may be further configured to recognize an object and control the display to display the mode conversion UI in response to the object being recognized, and wherein the motion task mode is controlled by tracking a motion of the recognized object.

The object may be one of a hand, a finger, an arm, and a face of a user, or an inanimate object. According to another aspect of an exemplary embodiment, there is provided a controlling method of a display apparatus including: recognizing a triggering input in an initial mode; entering an intermediate mode to display a guideline of an action input that activates a motion task mode in response to the triggering input being recognized; recognizing a first motion that corresponds to the action input in the intermediate mode; entering the motion task mode in response to the first motion being recognized while the guideline is displayed on the display apparatus; and controlling a function of the display apparatus in the motion task mode in response to a second motion being recognized.

The method may further include determining whether the first motion is performed within a predetermined size of a region that covers an area of the displayed guideline.

The method may further include switching the intermediate mode to the initial mode in response to the display apparatus failing to recognize the first motion within a predetermined period of time.

The method may further include changing an visual indicator of the guideline while the first motion is being recognized and processed.

The changing the visual indicator of the guideline comprises changing a typeface or a color of the guideline while the first motion is being recognized and processed.

The changing the visual indicator of the guideline comprises keeping the visual indicator flashing while the first motion is being recognized and processed.

According to the above-described various exemplary embodiments, a user may perform a motion task of a display apparatus through two steps of motion recognition without inconvenience due to misrecognition. Accordingly, a control function of a display apparatus which a user can use conveniently can be provided.

BRIEF DESCRIPTION OF THE DRAWINGS

The above and/or other aspects will be more apparent by describing certain exemplary embodiments, with reference to the accompanying drawings, in which:

FIGS. 7 and 8 are flowcharts provided to explain a controlling method of a display apparatus according to various exemplary embodiments.

DETAILED DESCRIPTION

The exemplary embodiments may vary, and may be provided in different exemplary embodiments. Specific exemplary embodiments will be described with reference to accompanying drawings and detailed explanation.

Figure 1:
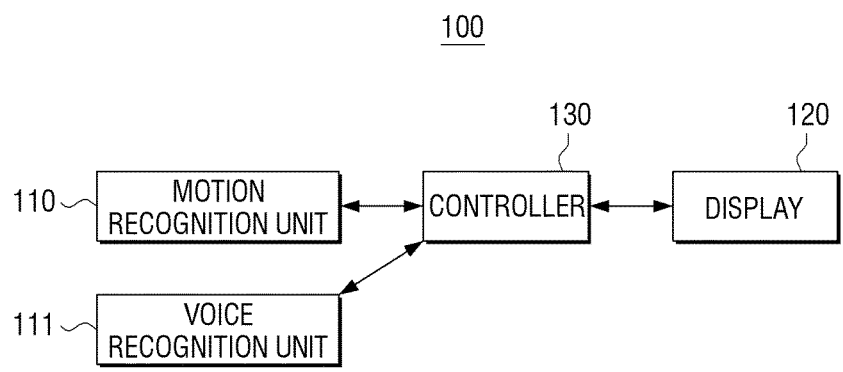
FIGS. 1 and 2 are block diagrams provided to explain configuration of a display apparatus according to various exemplary embodiments.

FIG. 1 is a block diagram illustrating configuration of a display apparatus 100 according to an exemplary embodiment. As shown in FIG. 1, the display apparatus 100 includes a motion recognition unit 110, a display 120, a controller 130, and a voice recognition unit 111. The display apparatus may be a smart TV, but this is only an example. The display apparatus 100 may be realized as various apparatuses having a display unit, such as smart phone, tablet PC, notebook PC, monitor, electronic album, kiosk, etc., but is not limited thereto.

The motion recognition unit 110 photographs an object and recognizes a user motion. Specifically, the motion recognition unit 110 photographs and recognizes an object using a photographing apparatus (for example, a camera, etc.), and may recognize a user motion by tracking a motion of the recognized object.

The display 120 displays image data or various user interfaces (UIs) under the control of the controller 130. In particular, the display 120 may display a mode conversion UI and a motion task UI. The mode conversion UI may refer to a UI for switching a current mode to a motion task mode which allows a user to control various functions (e.g., volume and channel control) of the display apparatus 100. The motion task UI may refer to a UI for controlling various control functions of the display apparatus 110 in the motion task mode.

The controller 130 controls overall configuration of the display apparatus 100. If an object is recognized through the motion recognition unit 110, the controller 130 controls the display 120 to display a motion conversion UI. The motion recognition unit 110 may further detect a motion of the object, and the controller 130 may enable the display 120 to display the motion conversion UI based on the recognized object and motion. Alternatively or combined with the motion recognition unit 110, the voice recognition unit 111 may detect a voice command required to activate the motion conversion UI.

In turn, if the motion recognition unit 110 detects a user motion while the motion conversion UI is displayed on the display 120, the motion recognition unit 110 may determine whether the detected user motion corresponds to a predetermined user motion set to activate the motion task mode. If the motion recognition unit 110 determines the detected user motion as corresponding to the predetermined user motion, the controller 130 may convert the current mode of the display apparatus 100 to the motion task mode. In addition, the controller 120 may control the display 120 to display a motion task UI and perform the motion task mode based on an input received through the motion task UI.

Specifically, if an object in a predetermined shape (e.g., a user's clenched fist, etc.) or motion (e.g., a user's hand waving) is recognized through the motion recognition unit 110, the controller 130 may control the display 120 to display the motion conversion UI and convert the current mode of the display apparatus 100 to the motion task mode in response to an input received through the motion conversion UI. According to an exemplary embodiment, the controller 130 may control the display 120 to display a mode conversion icon for converting to the motion task mode and a pointer which moves according to a user motion. According to another exemplary embodiment, the controller 130 may control the display 120 to display a motion pattern guide UI for guiding a user's predetermined motion pattern (for example, a motion pattern of waving a hand left and right).

Meanwhile, the controller 130 may operate the display apparatus 100 in a general driving mode before the motion recognition unit 110 recognizes the object, and convert the general driving mode to a power driving mode after the motion recognition unit 110 recognizes the object. In this case, the power driving mode may be a mode where the controller 130 uses more power (e.g., increasing the clock rate of the controller 130) to control the motion recognition unit 110 than the general driving mode.

If the motion recognition unit 110 recognizes the predetermined user motion through the mode conversion UI, the controller 130 may convert the current mode of the display apparatus 100 to the motion task mode. Then, the controller 130 may be able to control the display apparatus 100 using a user motion. For example, if a mode conversion icon and a pointer are displayed on the display 120, the pointer moves to the motion conversion icon according to a first user motion, and a second user motion of selecting the mode conversion icon is recognized, the controller 130 may convert the current mode of the display apparatus 100 to the motion task mode based on the second user motion. Furthermore, the display 120 may display a motion pattern guide UI which provides information of an associated predetermined motion that the user is expected to fulfill in order to enter the motion task mode. If the motion recognition unit 110 recognizes the associated motion pattern, the controller 130 may convert the current mode of the display apparatus 100 to the motion task mode.

When display apparatus 100 is in the motion task mode, the controller 130 may control the display 110 to display a motion task UI for performing the motion task mode. In this case, the motion task UI may include icons for volume control, change of channels, internet search engine, etc.

Meanwhile, if the motion recognition unit 110 does not recognize the predetermined user motion within a certain time period after the mode conversion UI is displayed, the controller 130 may convert the power driving mode to the general driving mode.

Accordingly, the display apparatus 100 may prevent unintentional mode change that may be caused by misrecognition of a user motion.

Figure 2:
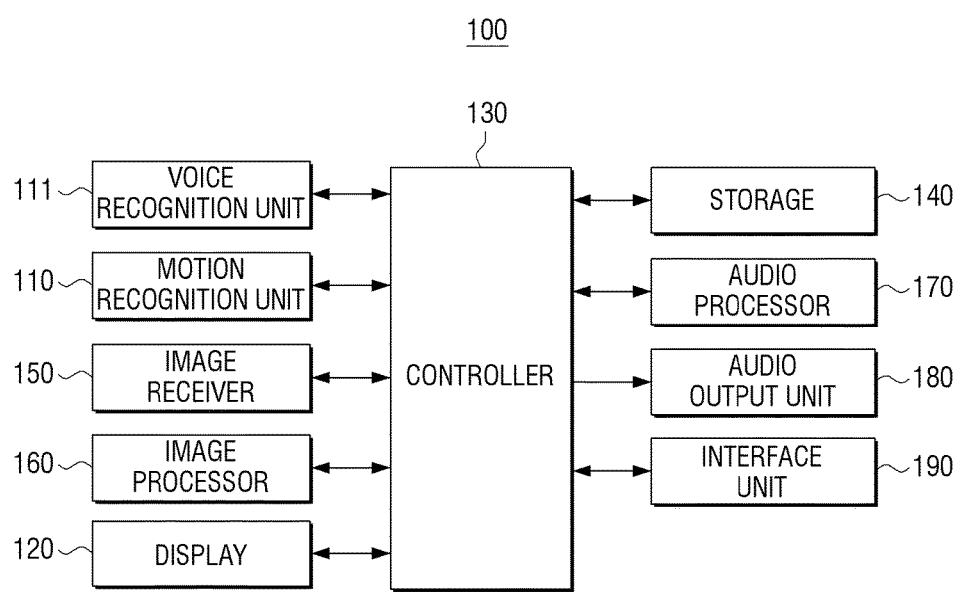

FIG. 2 is a block diagram illustrating configuration of the display apparatus 100 in detail. As shown in FIG. 2, the display apparatus 100 includes the motion recognition unit 110, the voice recognition unit 111, the display 120, the controller 130, a storage 140, an image receiver 150, an image processor 160, an audio processor 170, an audio output unit 180, and an interface unit 190.

Figure 3A:
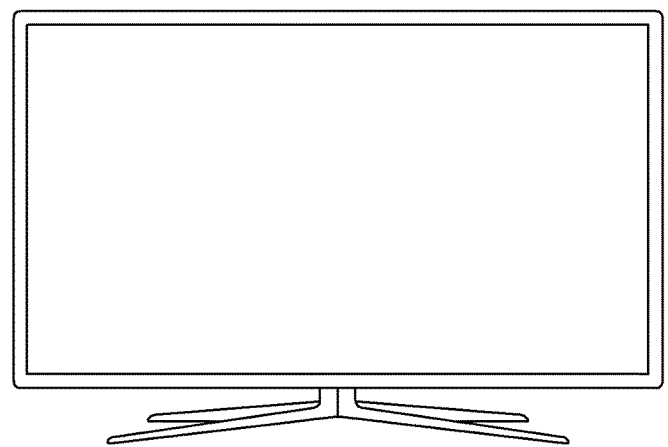
FIGS. 3A and 3B are views provided to explain an object recognized by a display apparatus according to an exemplary embodiment.
Figure 3A:
Figure 3B:
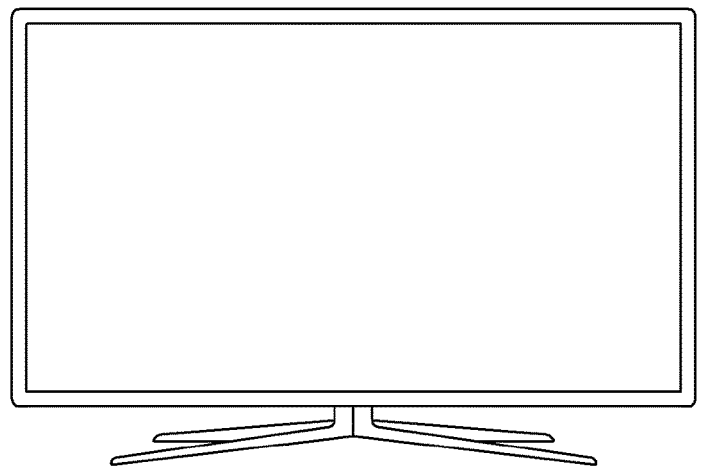
Figure 3B:
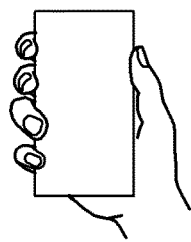

The motion recognition unit 110 photographs an object and recognizes a user motion in an initial mode of the display apparatus 100. Specifically, the motion recognition unit 110 photographs and recognizes an object using a photographing apparatus (for example, a camera, etc.), and may recognize a user motion by tracking a motion of the recognized object. In addition, the motion recognition unit 110 receives an image signal (for example, successive frames) of an object and a user motion photographed and provides the image signal to the controller 130. For example, the motion recognition unit 110 may be realized as a camera unit consisting of a lens and an image sensor. The motion recognition unit 110 may be realized in a united form with the display apparatus 100 or separately from the display apparatus 100. The motion recognition unit 110 which is separate from the display apparatus 100 may be connected via cable or wirelessly. In this case, as illustrated in FIGS. 3A and 3B, the object may be a human hand or an object in the shape of a stick. In addition, an object which is distinguished from various body parts including a finger, an arm, and a face may be recognized as an object. In addition, the motion recognition unit 110 may predetermine and store an object which can be recognized. If using a predetermined object is used may be advantageous for the motion recognition unit 110 to analyze the shape and motion of an object. For example, if a user motion is recognized using an object in a predetermined shape, it may take less time for the motion recognition unit 110 to analyze the shape of the motion.

The display 120 displays an image signal input from various sources. For example, the display 120 may display an image corresponding to an image signal received through an image receiver. In addition, the display 120 may display image data (for example, a moving image) input through an external terminal input unit.

In particular, if the motion recognition unit 110 of the display apparatus 100 recognizes a predetermined object (for example, a user hand with two fingers spread), the display 120 may display the mode conversion UI for converting to the motion task mode. For example, the motion conversion UI may include a mode conversion icon and a pointer which moves according to a user motion. Furthermore, the motion conversion UI may include a motion pattern guide UI for guiding a user's predetermined motion pattern.

If the motion recognition unit 110 of the display apparatus 100 recognizes a predetermined user motion while the motion conversion UI is displayed, the display 120 may display a motion task UI for performing the motion task mode. The state of the display apparatus 100 where the motion conversion UI is displayed may be referred to as an intermediate mode. The motion task UI may include icons to control various functions of the display apparatus 100. For example, if the display apparatus 100 is a smart TV, the motion task UI may include icons to perform at least one of change of channels, volume control, Internet browsing, search and play of stored contents (for example, moving image, music, photo, etc.), and search of a connected external device, etc.

The storage 140 stores various programs and data necessary for the operations of the display apparatus 100. In addition, the storage 140 may include Random Access Memory (RAM) and Read-Only Memory (ROM). As it is well-known in the related field, the ROM transmits data and a command to a CPU uni-directionally, and the RAM is generally used to transmit data and a command bi-directionally.

The image receiver 150 receives a stream signal and transmits the stream signal to the controller 130 or the image processor 160.

The image processor 160 processes a signal regarding image information constituting contents. Once a stream signal is received, the image processor 160 may divide the signal into an image signal, a sound signal, and a data signal by de-multiplexing the stream. If the de-multiplexed image signal is an encoded image signal, the image processor 160 performs decoding using a decoder. For example, the image processor 160 may decode an encoded image signal in MPEG-2 standard using an MPEG-2 decoder, and decode an image signal in Digital Multimedia Broadcasting (DMB) or H.264 standard of DVB-H using an H.264 decoder. In addition, the image processor 160 may process brightness, tint, color tone, etc., of an image signal.

The audio processor 170 generates an audio signal by performing various audio signal processing such as audio decoding, noise filtering, amplification, etc. with respect to audio data of each content. The audio signal generated by the audio processor 170 is provided to the audio output unit 180.

The audio output unit 180 outputs an audio signal generated by the audio processor 170. The audio output unit 180 may be realized in a united form with the display apparatus 100 or separately from the display apparatus 100. The audio output unit 180 which is separate from the display apparatus 100 is connected to the display apparatus 100 via cable or wirelessly.

The interface unit 190 allows the display apparatus 100 to exchange commands with a user. For example, the interface unit 190 may include keypad, touch screen, remote controller, mouse, etc.

The controller 130 controls other elements of the display apparatus 100 such as the motion recognition unit 110, the display 120, etc. The controller 130 may include Read Only Memory (ROM) and Random Access Memory (RAM) for storing modules and data to control a CPU and the display apparatus 100.

The motion recognition unit 110 may be implemented in the controller 130 as a motion detecting module and motion database, and the motion detecting module of the controller 130 may recognize an object and a user motion from an image of the object and the user motion that is captured by a camera connected to the controller 130. The controller 130 may divide the image (e.g., successive frames) corresponding to the user motion input into a background area and an object area using the motion recognition module, and recognize successive motions of the object. The controller 130 stores the successive frames of the received image, and detects the object and the user motion from the stored frames. The controller 130 detects the object by detecting at least one of one of shape, color, and motion of the objects included in the frames. The controller 130 may track the motion of the detected object using the location of each object included in of the successive frames. In this case, the controller 130 may determine whether the detected motion corresponds to a predetermined user motion which is set to activate the motion task mode..

The controller 130 determines a motion according to the tracked shape and motion of the object. For example, the controller 130 determines a user motion by using at least one of change, speed, location, and direction of the object. The user motion includes a grab where a hand is closed, a pointing move where a displayed cursor is moved by a hand, a slap where a hand is moved in one direction at a speed faster than a predetermined speed, a shake where a hand is shaken left/right or up/down, and a rotation where a hand is rotated. In addition, a spread motion where a closed hand is spread may be further included.

The controller 130 determines whether an object goes beyond a predetermined area (e.g., a square of 40 cm×40 cm) within a predetermined time (e.g., 800 ms) in order to determine whether a user motion is a pointing move or a slap. If the object does not go beyond the predetermined area within the predetermined time, the controller 130 may determine that the user motion is a pointing move. However if the object goes beyond the predetermined area within the predetermined time, the controller 130 may determine that the user motion is a slap. Furthermore, if it is determined that the speed of an object is the same or less than a predetermined speed (e.g., 30 cm/s), the controller 130 determines that the user motion is a pointing move. However, if the speed of the object exceeds the predetermined speed, the controller 130 determines that the user motion is a slap.

As described above, the controller 130 performs a motion task function in the display apparatus 100 using a recognized motion.

More specifically, if an object in a predetermined shape is recognized in the motion recognition unit 110, the controller 130 controls the display 120 to display a motion conversion UI for converting to the motion task mode. If a predetermined user motion is recognized through the motion recognition unit 110 using the displayed motion conversion UI, the controller 130 converts the mode of the display apparatus 100 to the motion task mode to control the display apparatus 100 using a user motion. In addition, the controller 130 controls the display 120 to display a motion task UI for performing the motion task mode.

According to an exemplary embodiment, the controller 130 may control the display 120 to display a mode conversion icon for converting to the motion task mode and a pointer which moves according to a user motion. In this case, if the pointer moves to the mode conversion icon according to a first user motion and a second user motion of selecting the mode conversion icon is recognized, the controller 130 may control the display apparatus 100 to enter the motion task mode.

Figure 4A:
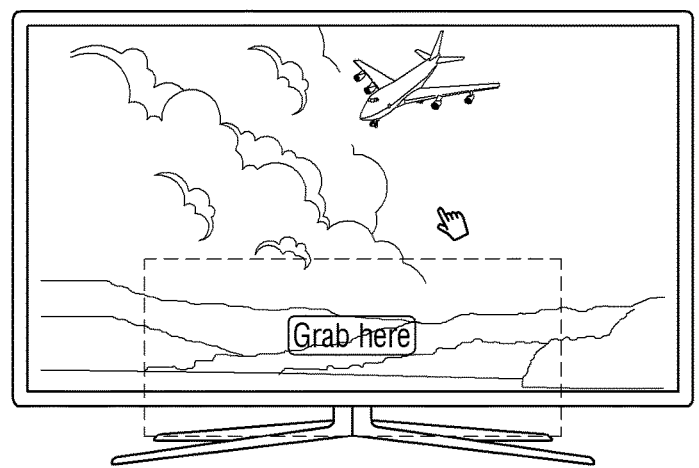
FIGS. 4A to 4C are views provided to explain a method of converting to a motion task mode using a motion conversion icon and a pointer according to an exemplary embodiment.

Specifically, if an object is recognized in the motion recognition unit 110, as illustrated in FIG. 4A, the controller 130 may control the display 120 to display a mode conversion icon and a pointer which moves according to a user motion on a part of the screen. In this case, the mode conversion icon and the pointer may be transparent or semi-transparent in order to minimize interference with a user's viewing. Meanwhile, the mode conversion icon may include a message indicating a motion or a series of motions that the user is expected to fulfill to activate the motion task mode. For example, if a motion of grabbing the mode conversion icon is required, as illustrated in FIG. 4A, the message of 'Grab here' may be inserted into the icon. Through such a message, a user may control the display apparatus 100 more intuitively. When the motion recognition unit 110 detects the motion of grabbing, the motion recognition unit 110 may determine whether the motion occurs within a certain region around the mode conversion icon. For example, if the motion recognition unit 110 determines that the detected motion occurs within a dashed-lined region of FIG. 4A, the motion recognition unit 110 may recognize the detected motion as corresponding to a motion for activating the motion task mode.

Figure 4B:
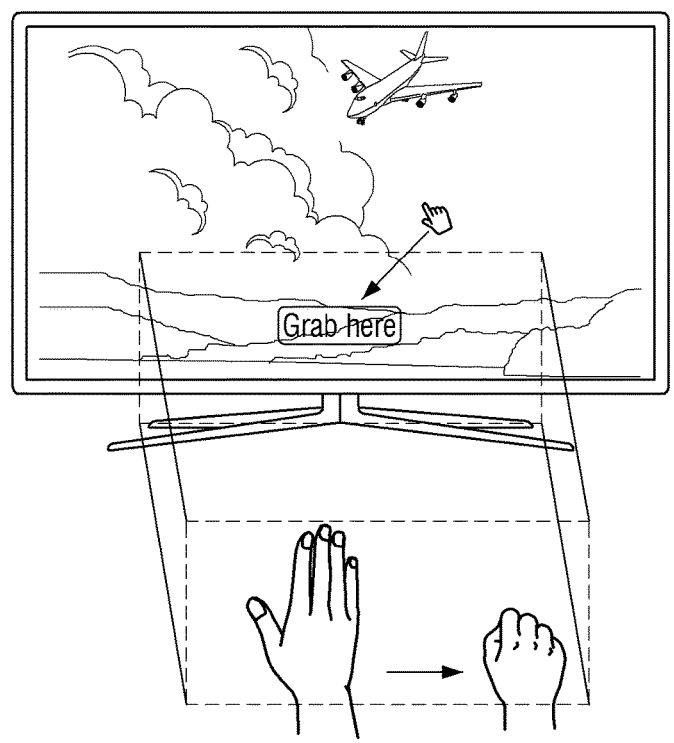

As illustrated in FIG. 4B, the pointer may move to the mode conversion icon according to the recognized user motion. When the pointer is placed on the mode conversion icon, the controller 130 activates the motion task mode. A user motion for selecting the mode conversion icon and activating the motion task mode is not limited to grabbing, and may include clicking, dragging, shaking, etc. In addition, the display 120 may not display the pointer, and may use other visual indicators to indicate that a user motion is recognized and being processed. For example, the mode conversion icon may start flashing or the appearance of the icon (e.g., typeface, color, etc.) may change while the user motion is being recognized and processed.

Figure 4C:
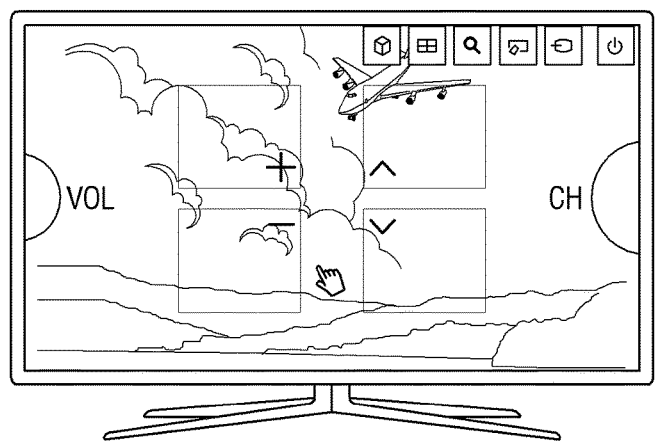

If the display apparatus 100 enters the motion task mode, as illustrated in FIG. 4C, the controller 130 may control the display 120 to display a motion task UI. In addition, the controller 130 may control various functions of the display apparatus 100 through the motion task UI according to a user motion which is recognized by tracking a recognized object. For example, the controller 130 may perform volume control, change of channels, etc. as illustrated in the left and right sides of FIG. 4C. In addition, the controller 130 may perform Internet browsing, media content search, reservation setting, etc. using icons in the upper right side of FIG. 4C.

According to another exemplary embodiment, the controller 130 may control the display 120 to display a motion pattern guide UI for guiding a user's predetermined motion pattern to convert to the motion task mode. In this case, if a user motion having a pattern corresponding to the motion pattern guide UI is recognized, the controller 130 may activate the motion task mode.

Figure 5A:
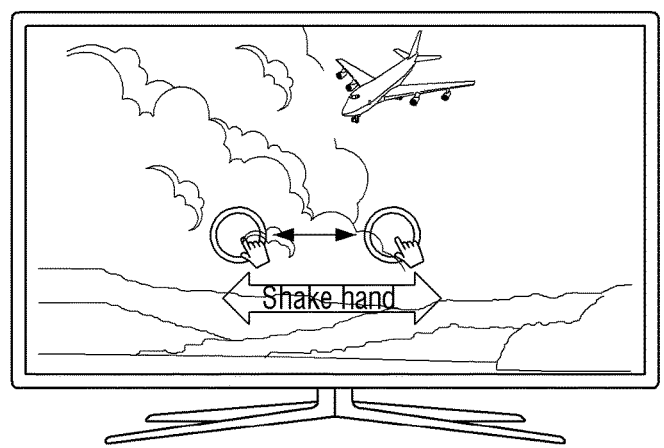
FIGS. 5A to 6C are views provided to explain a method of converting to a motion task mode using a motion pattern guide User Interface (UI) and a user motion corresponding to a pattern according to an exemplary embodiment.
Figure 5B:
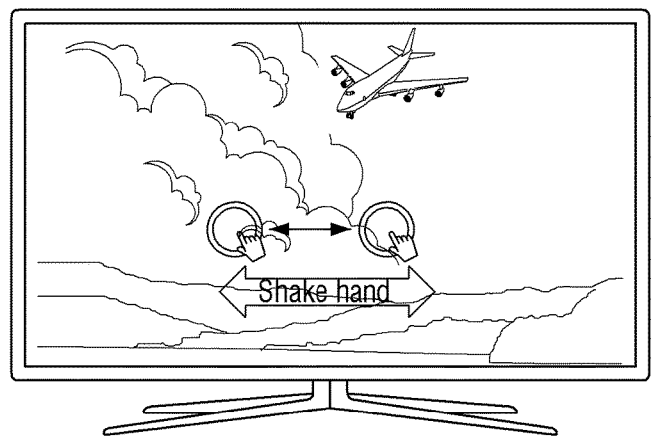
Figure 5B:
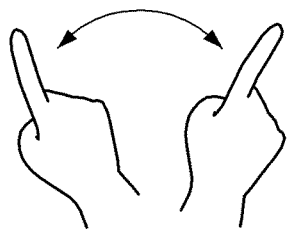
Figure 5C:
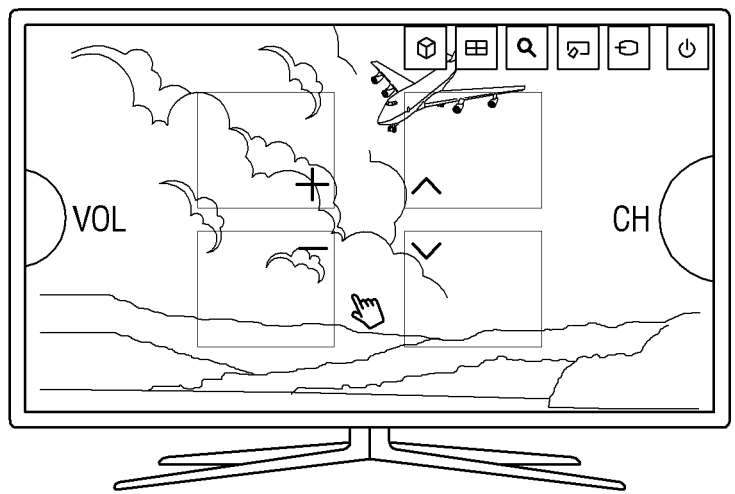

Specifically, if an object is recognized in the motion recognition unit 110, as illustrated in FIG. 5A, the controller 130 may control the display 120 to display a motion pattern guide UI on a part of the screen. In this case, the motion pattern UI may be transparent or semi-transparent to minimize interference with a user viewing contents. For example, the motion pattern guide UI may be represented as a guidance message with a simple arrow to inform a user motion that a user should take. As illustrated in FIG. 5A, the controller 130 may display the message of 'Shake hand' with a bidirectional arrow on the display 120 to lead a user to perform the motion of shaking a hand along so that a user may understand the motion to take intuitively. In addition, as illustrated in FIG. 5B, if a user motion having a pattern corresponding to the motion pattern guide UI is recognized, the controller 130 converts the mode of the display apparatus 100 to the motion task mode. In this case, the controller 130 may control the display 120 to additionally display a pointer which moves according to a user motion so as to allow a user to check the state where a user motion is recognized. For example, if a user waves a hand according to a motion pattern guide UI for guiding the motion of waving a hand, the controller 130 may control the display 120 to display a pointer moving left and right in accordance with the user's motion of waving a hand on a part of the screen. If the display apparatus 100 is in the motion task mode, as illustrated in FIG. 5C, the controller 130 controls the display 120 to display a motion task UI.

In addition, the controller 130 may control to perform various functions of the display apparatus 100 using icons on the motion task UI according to a user motion which is recognized by tracking a recognized object. For example, the controller 130 may perform functions such as volume control, change of channels, etc. as illustrated in the left and right sides of FIG. 5C. Further, the controller 10 may also perform Internet browsing, media content search, reservation setting, etc. using icons displayed on the upper right side of FIG. 5C.

Figure 6A:
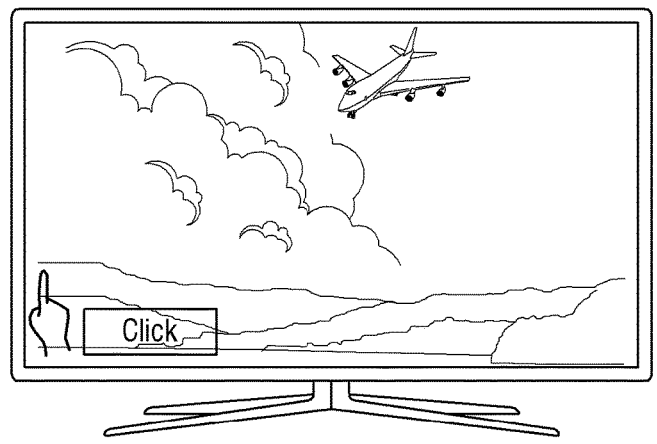
Figure 6B:
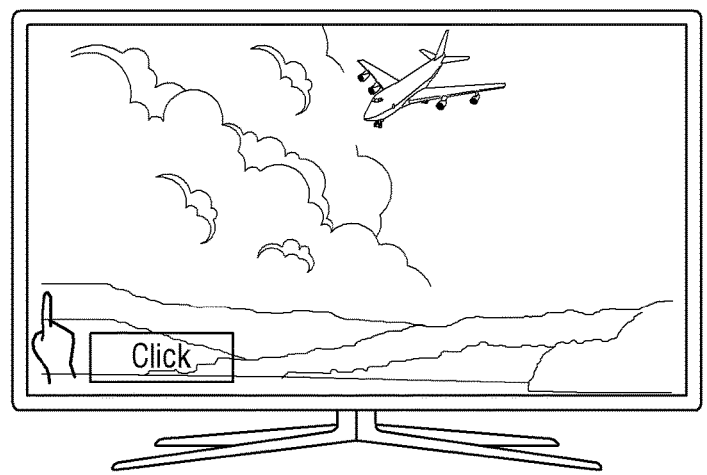
Figure 6B:
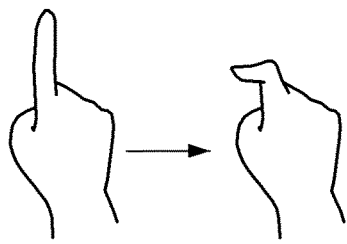
Figure 6C:
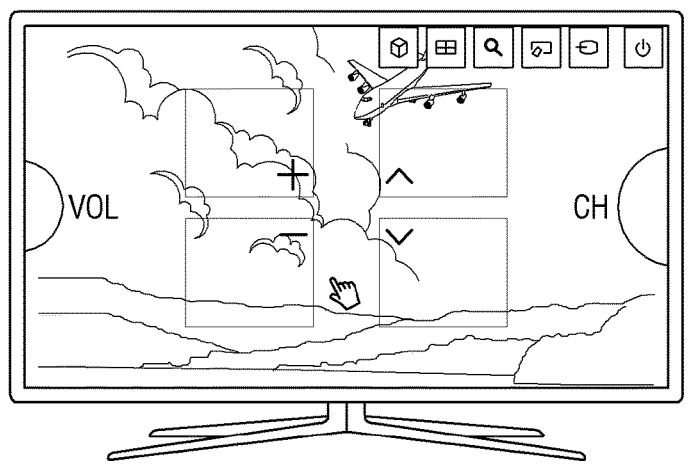

According to another exemplary embodiment of an object being recognized in the motion recognition unit 110, as illustrated in FIG. 6A, the controller 130 may control the display 120 to display a motion pattern guide UI on a part of the screen. In this case, the motion pattern guide UI may be transparent or semi-transparent in order to minimize interference with a user viewing contents. For example, the motion pattern guide UI may include a guidance message or an animation guide for informing a user of a motion to take. As illustrated in FIG. 6A, the controller 130 may display the message of "Click" along with an animation showing a clicking operation using a finger to lead a user to perform a clicking operation using a finger so that the user may understand the motion to take intuitively. In addition, as illustrated in FIG. 6B, if a user motion of having a pattern corresponding to the motion pattern guide UI is recognized, the controller 130 converts the current mode of the display apparatus 100 to the motion task mode. For example, if a user performs a clicking operation according to a motion pattern guide UI for guiding the clicking operation using a finger, the mode of the display apparatus 100 is converted to the motion task mode. If the mode of the display apparatus 100 is converted to the motion task mode, as illustrated in FIG. 6C, the controller 130 controls the display 120 to display a motion task UI. In addition, the controller 130 may perform various functions of the display apparatus 100 using icons on the motion task UI according to a user motion which is recognized by tracking a recognized object. For example, the controller 130 may perform volume control and change of channels as illustrated in the left and right sides of FIG. 6C. In addition, the controller 130 may perform Internet browsing, media content search, reservation setting, etc. using icons displayed on the upper right side of FIG. 6C.

According to an exemplary embodiment, the controller 130 may drive the display apparatus 100 in the general driving mode before an object is recognized, and convert the general driving mode the power driving mode after the motion recognition unit 110 recognizes the object. In this case, the power driving mode is a mode where resources (for example, power consumption) required for the controller 130 to control the motion recognition unit 100 increases in comparison with the general driving mode.

Specifically, the display apparatus 100 performs various functions and thus, it is necessary for the display apparatus 100 to use power and resources of the display apparatus 100 efficiently. The same is also true of the motion recognition unit 110 which performs the function of recognizing a user motion. Accordingly, the controller 130 may control the display apparatus 100 to operate in the general driving mode before the object is recognized in order to reduce distribution of resources required to control the motion recognition unit 100. For example, the controller 130 may reduce the clock rate, power consumption, available memory capacity, and the like in the general driving mode. However, if the object is recognized by the motion recognition unit 110, the controller 130 may convert the general driving mode to the power driving mode to improve accuracy of recognition of the user motion. If the display apparatus 100 is in the power driving mode, the controller 130 may increase distribution of resources required to control the motion recognition unit 110 increasing the clock rate, power consumption, available memory capacity, etc. temporarily so that the user motion can be recognized more quickly and accurately. In addition, if the display apparatus 100 is in the power driving mode, the controller 130 may increase the resolution of a camera constituting the motion recognition unit 110 or a photographed image frame, etc., or increase the number of cameras which are used for recognizing the user motion. According to the above-described feature, the display apparatus 100 with low power and high efficiency, which can determine whether a motion recognition is required preferentially, can be realized.

According to another exemplary embodiment, if a predetermined user motion is not recognized within a predetermined time after a mode conversion UI is displayed, the controller 130 may convert the driving mode of the display apparatus 100 from the power driving mode to the general driving mode. For example, if a user spreads a hand and raises the hand to call someone in a different place, the motion recognition unit 110 recognizes the user's spread hand as an object, and the controller 130 may control the display 120 to display a mode conversion UI and convert the driving mode of the display apparatus 100 to the power driving mode. When such misrecognition happens, a user's predetermined motion would not be recognized until a predetermined time elapses, so the controller 130 may convert the power driving mode to the general driving mode again.

In the power driving mode, a user motion can be recognized quickly and accurately, but maintaining the power driving mode for a long time would be inefficient for the display apparatus 100 since it requires high power consumption. Accordingly, the controller 130 may maintain the power driving mode only for a predetermined time period after the mode conversion UI is displayed. Even when the driving mode of the display apparatus 100 is converted to the power driving mode due to possible misrecognition of an object, the controller 130 converts the driving mode of the display apparatus 100 to the general driving mode again after the predetermined time elapses. Thus, unnecessary consumption of CPU resources, power, etc. due to misrecognition of an object can be prevented.

According to another exemplary embodiment, while the display apparatus 100 is in the motion task mode, the controller 130 may control the display apparatus 100 according to a user motion which is recognized by tracking a recognized object. Specifically, in the motion task mode, the controller 130 may control the display 120 to display icons for performing several functions on a motion task UI and select icons using a pointer, etc. which moves according to a user motion to execute the corresponding functions of the display apparatus, which are represented as each of the icons.

Meanwhile, in the motion task mode, the controller 130 may control the display apparatus 100 according to a user motion which is recognized by tracking only a selected object through a selective motion tracking. Specifically, in order to convert the mode of the display apparatus 100 to the motion task mode, an object should be recognized in the motion recognition unit 110 first. In this case, the controller 130 may control the motion recognition unit 110 to recognize only objects which have a similar shape in a close distance using information regarding the shape, location, etc. of the recognized object. For example, in the motion task mode, the controller 130 may control the display apparatus 100 by moving a recognized object in order to convert the mode of the display apparatus 100 to the motion task mode. Here, if a motion recognition regarding a recognized object to convert the mode of the display apparatus 100 to the motion task mode is processed selectively, the resources of the display apparatus 100 can be used efficiently. However, the recognized object which is tracked in the motion task mode is not limited to an object which is recognized to convert the mode of the display apparatus 100 to the motion task mode.

According to the above-described display apparatus 100, a user may perform a motion task of the display apparatus through two steps of motion recognition without any inconvenience due to misrecognition.

Hereinafter, a controlling method of a display apparatus will be described with reference to FIGS. 7 and 8.

Figure 7:
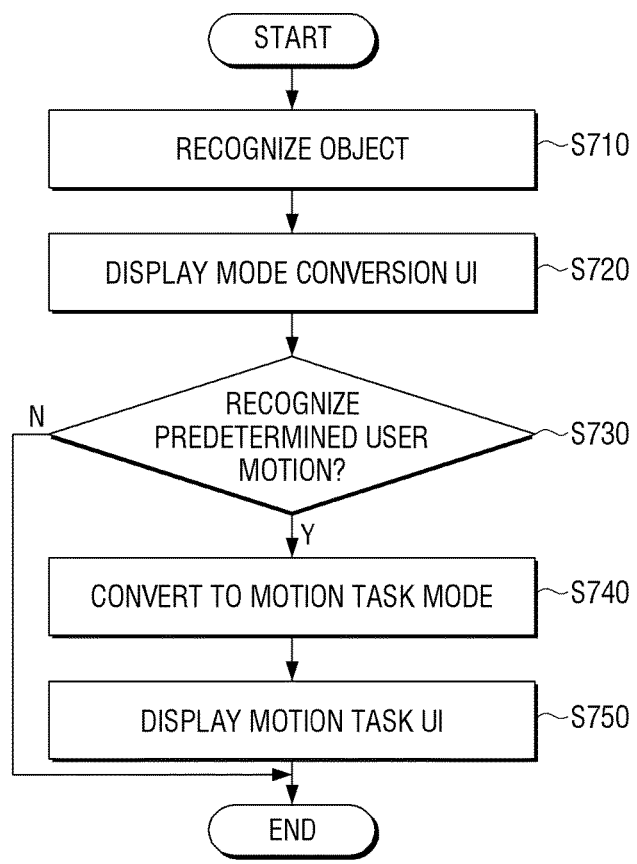

As shown in FIG. 7, the display apparatus 100 recognizes an object (S710). In this case, the object may be one of hand, finger, arm, face, and object.

In turn, the display apparatus 100 displays a mode conversion UI to convert the current mode of the display apparatus 100 to the motion task mode (S720). In this case, the mode conversion UI may refer to an UI for displaying a mode conversion icon and a pointer which moves according to a user motion. The mode conversion UI may also refer to a UI for displaying a motion pattern guide UI.

The display apparatus 100 determines whether a predetermined user motion using the mode conversion UI is recognized (S730). In this case, the predetermined user motion may be a user motion of selecting the mode conversion icon after the pointer is moved to the mode conversion icon according to a user motion. The predetermined user motion may be also a user motion having a pattern corresponding to the motion pattern guide UI.

If the predetermined user motion is recognized (5730-Y), the mode of the display apparatus 100 is converted to the motion task mode (S740). Subsequently, the display apparatus 100 displays a motion task UI to perform the motion task mode.

According to the above-described controlling method of the display apparatus 100, a user may prevent unintentional mode conversion due to misrecognition of a user motion.

As shown in FIG. 8, the display apparatus 100 operates in the general driving mode before an object is recognized (S810).

The display apparatus 100 recognizes an object (S820), and the display apparatus 100 converts the general driving mode to the power driving mode. In comparison with the general driving mode, the power driving mode is a mode where resources (for example, power consumption) required to recognize a user motion are increased. For example, the power driving mode may be a driving mode where resources required to recognized a user motion, such as the clock rate, power consumption, etc. are increased temporarily, the number of cameras used to recognize a user motion is increased, or the resolution of a camera or an image frame is increased.

The display apparatus 100 displays a mode conversion UI (S840). After the mode conversion UI is displayed, the display apparatus 100 determines whether a predetermined user motion is recognized within a predetermined time (S850).

If the predetermined user motion is recognized within the predetermined time (S850-Y), the current mode of the display apparatus 100 is converted to the motion task mode (S860), and the display apparatus 100 displays a motion task UI (S870).

If the predetermined user motion is not recognized within the predetermined time (S850-N), the driving mode of the display apparatus 100 is converted from the power driving mode to the general driving mode (S880). In particular, if the driving mode of the display apparatus 100 is converted to the power driving mode due to misrecognition of an object, the power driving mode is converted to the general driving mode again after the predetermined time elapses and thus, unnecessary consumption of CPU resources and power can be prevented.

According to an exemplary embodiment, the motion task mode can be controlled according to a user motion which is recognized by tracking a recognized object. Specifically, if the mode of the display apparatus is converted to the motion task mode, the motion task UI may display icons for performing various functions, and a user may control the display apparatus 100 by executing corresponding functions which are represented as each of the icons using a pointer that moves according to a user motion. Meanwhile, if a method of processing motion recognition with respect to such an object selectively is performed, the resources of the display apparatus 100 can be used efficiently.

A program code for performing a controlling method according to the above-described various exemplary embodiments can be stored in various types of recording medium. Specifically, the program code can be stored in various types of recording medium which is readable by a terminal, such as Random Access Memory (RAM), flash memory, Read Only Memory (ROM), Erasable Programmable ROM (EPROM), Electronically Erasable and Programmable ROM (EEPROM), register, hard disk, removable disk, memory card, USB memory, CD-ROM, etc.

The foregoing embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A controlling method of a display apparatus, comprising:
   based on a captured image of an object corresponding to a predetermined shape while the display apparatus is operated in a general driving mode, activating an intermediate mode and displaying a mode conversion user interface (UI) that provides a guideline of a first motion for switching from the intermediate mode to a motion task mode that allows a user to control at least one function of the display apparatus via a second motion different from the first motion;
   based on recognizing the first motion that corresponds to the guideline within a predetermined time since the intermediate mode is activated, activating the motion task mode and displaying a motion task UI to control the display apparatus in accordance with the second motion;
   based on recognizing the second motion to control the at least one function of the display apparatus while the display apparatus is operated in the motion task mode, controlling the at least one function corresponding to the second motion,
   wherein the general driving mode is switched to the motion task mode through the intermediate mode that occurs between the general driving mode and the motion task mode, based on the first motion being recognized within the predetermined time since the intermediate mode is activated.

2. The method as claimed in claim 1, further comprising recognizing, in the general driving mode, a shape of the object in the captured image as a triggering input that activates the intermediate mode.

3. The method as claimed in claim 2, wherein further comprising recognizing, in the general driving mode, a voice command as the triggering input that activates the intermediate mode.

4. The method as claimed in claim 1, wherein the motion conversion UI comprises a mode conversion icon configured to activate the motion task mode and a pointer configured to move towards the mode conversion icon according to the first motion.

5. The method as claimed in claim 4, wherein the entering the motion task mode comprises entering the motion task mode in response to the pointer moving to and being placed on the mode conversion icon according to the first motion.

6. The method as claimed in claim 1, wherein the guideline indicates a predetermined motion pattern set to perform the first motion.

7. The method as claimed in claim 6, wherein the entering the motion task mode comprises entering the motion task mode in response to the first motion corresponding to the predetermined motion pattern.

8. The method as claimed in claim 1, further comprising:
   operating the display apparatus in the general driving mode before the mode conversion UI is displayed, and
   in response to the mode conversion UI being displayed, converting the general driving mode to a power driving mode in which resolution and power consumption of the display apparatus increases in comparison with the general driving mode to perform motion recognition, the power driving mode comprising the intermediate mode and the motion task mode.

9. The method as claimed in claim 8, further comprising converting the power driving mode into the general driving mode in response to the second motion not being recognized with the predetermined time after the mode conversion UI is displayed.

10. The method as claimed in claim 1, wherein the motion task mode is controlled by tracking a motion of the object.

11. The method as claimed in claim 10, wherein the object is one of a hand, a finger, an arm, and a face of the user, or an inanimate object.

12. A display apparatus, comprising:
    a motion recognition unit configured to recognize a first motion and a second motion of a user;
    a display configured to display a user interface (UI); and
    a controller configured to:
    based on a captured image of an object corresponding to a predetermined shape through the motion recognition unit while the display apparatus is operated in a general driving mode, activate an intermediate mode and control the display to display a mode conversion user interface (UI) that provides a guideline of a first motion for switching from an intermediate mode to a motion task mode that allows the user to control at least one function of the display apparatus via a second motion different from the first motion,
    based on recognizing the first motion corresponding to the guideline within a predetermined time since the intermediate mode is activated, activating the motion task mode and control the display to a motion task UI to control the display apparatus in accordance with the second motion,
    based on recognizing the second motion to control the at least one function of the display apparatus while the display apparatus is operated in the motion task mode, control the at least one function corresponding to the second motion,
    wherein the general driving mode is switched to the motion task mode through the intermediate mode that occurs between the general driving mode and the motion task mode, based on the first motion being recognized within the predetermined time since the intermediate mode is activated.

13. The apparatus as claimed in claim 12, wherein the controller is further configured to control the display to display a mode conversion icon configured to activate the motion task mode and a pointer configured to move toward the mode conversion icon according to the first motion.

14. The apparatus as claimed in claim 13, wherein the controller is further configured to enter the motion task mode in response to the pointer moving to and being placed on the mode conversion icon according to the first motion.

15. The apparatus as claimed in claim 12, wherein the controller is further configured to control the display to display the guideline through a motion pattern guide UI which guides the user to take a predetermined motion to enter the motion task mode.

16. The apparatus as claimed in claim 15, wherein the controller is further configured to enter the motion task mode in response to a pattern of the first motion that corresponds to the motion pattern guide UI being recognized.

17. The apparatus as claimed in claim 12, wherein the controller is further configured to drive the display in the general driving mode before the motion conversion UI being displayed, and in response to the motion conversion UI being displayed, convert the general driving mode to a power driving mode in which power consumption of the display apparatus increases in comparison with the general driving mode to perform motion recognition, the power driving mode comprising the intermediate mode and the motion task mode.

18. The apparatus as claimed in claim 17, wherein the controller is further configured to convert the power driving mode to the general driving mode in response to a predetermined motion not being recognized within a predetermined time after the mode conversion UI is displayed.

19. The apparatus as claimed in claim 12, wherein the controller is further configured to recognize an object and control the display to display the mode conversion UI in response to the object being recognized, and wherein the motion task mode is controlled by tracking a motion of the recognized object.

20. The apparatus as claimed in claim 12, wherein the object is one of a hand, a finger, an arm, and a face of the user, or an inanimate object.

21. A controlling method of a display apparatus, comprising:
recognizing a triggering input while the display apparatus is operated in a general driving mode;
controlling the display apparatus to operate in an intermediate mode to display a guideline of an action input that activates a motion task mode before activating the motion task mode that allows a user to control at least one function of the display apparatus via a motion input;
switching from the intermediate mode to the motion task mode based on a recognizing a first motion that corresponds to the action input within a predetermined time since the intermediate mode is activated; and
recognizing a second motion to control the at least one function of the display apparatus while the display apparatus is operated in the motion task mode,
controlling the at least one function corresponding to the second motion
wherein the general driving mode is switched to the motion task mode through the intermediate mode that occurs between the general driving mode and the motion task mode, based on the first motion being recognized within the predetermined time since the intermediate mode is activated, and
wherein the triggering input, the first motion, and the second motion are different from each other.

22. The method as claimed in claim 21, further comprising identifying whether the first motion is performed within a predetermined size of a region that covers an area of the displayed guideline.

23. The method as claimed in claim 21, further comprising switching the intermediate mode to the general driving mode in response to the display apparatus failing to recognize the first motion within the predetermined time.

24. The method as claimed in claim 21, further comprising changing a visual indicator of the guideline while the first motion is being recognized and processed.

25. The method as claimed in claim 24, wherein the changing the visual indicator of the guideline comprises changing a typeface or a color of the guideline while the first motion is being recognized and processed.

26. The method as claimed in claim 24, wherein the changing the visual indicator of the guideline comprises keeping the visual indicator flashing while the first motion is being recognized and processed.

* * * * *